United States Patent

Mack et al.

[11] Patent Number: 5,892,343
[45] Date of Patent: Apr. 6, 1999

[54] WINDSHIELD WIPER ARRANGEMENT

[75] Inventors: Rolf Mack, Sinzheim; Stefan Koch, Ottersweier, both of Germany

[73] Assignee: Robert Bosch GmbH, Stuttgart, Germany

[21] Appl. No.: 765,498
[22] PCT Filed: Aug. 25, 1995
[86] PCT No.: PCT/DE95/01134
 § 371 Date: Jan. 9, 1997
 § 102(e) Date: Jan. 9, 1997
[87] PCT Pub. No.: WO96/07566
 PCT Pub. Date: Mar. 14, 1996

[30] Foreign Application Priority Data

Sep. 6, 1994 [DE] Germany ............... 44 31 699.2

[51] Int. Cl.$^6$ ................. H02P 3/00; B60S 1/08
[52] U.S. Cl. .............. 318/444; 318/443; 318/282; 318/283; 318/DIG. 2; 15/250.17; 15/250.13
[58] Field of Search ................ 318/440–469, 318/483, 484, DIG. 2; 340/602, 601, 603, 604, 438; 15/250.2, 250.3, 250.13, 250.15

[56] References Cited

U.S. PATENT DOCUMENTS

| | | | |
|---|---|---|---|
| 4,578,591 | 3/1986 | Floyd et al. ............... | 307/10 R |
| 4,663,575 | 5/1987 | Juzswik et al. ............ | 318/444 |
| 4,689,535 | 8/1987 | Tsunoda et al. ............ | 318/443 |
| 4,866,357 | 9/1989 | Miller et al. ............... | 318/443 |
| 5,049,794 | 9/1991 | Okada et al. ............... | 318/443 |
| 5,086,260 | 2/1992 | Ito ............................. | 318/266 |
| 5,235,260 | 8/1993 | Furukoshi ................... | 318/443 |
| 5,245,259 | 9/1993 | Nakamura et al. .......... | 318/443 |
| 5,252,898 | 10/1993 | Nolting et al. .............. | 318/444 |
| 5,285,138 | 2/1994 | Okada ......................... | 318/280 |
| 5,306,992 | 4/1994 | Droge ......................... | 318/483 |
| 5,404,085 | 4/1995 | Resch et al. ................ | 318/443 |
| 5,568,027 | 10/1996 | Teder ........................... | 318/483 |
| 5,581,240 | 12/1996 | Egger ........................... | 340/602 |

FOREIGN PATENT DOCUMENTS

| | | |
|---|---|---|
| 4104565 | 8/1991 | Germany . |
| 4032922 | 4/1992 | Germany . |
| 64-52557 | 2/1989 | Japan . |
| 2-158446 | 9/1990 | Japan . |

Primary Examiner—Paul Ip
Attorney, Agent, or Firm—Spencer & Frank

[57] ABSTRACT

A windshield wiping arrangement with at least one wiper arm (11) is disclosed, which is operated by an electromotor (10) with reversible rotational direction. A time determination device (19) is provided, which determines the time ($T_n$; $T_{n+1}$; $T_{n+2}$; $T_{n+3}$; $T_{n+4}$) following the triggering of a wiping operation. Furthermore, a time presetting device (22) is provided, which presets a maximum allowable time ($T_{max}$; $T_{max,n+1}$; $T_{max,n+2}$; $T_{max,n+3}$) for the duration of half of a wiping cycle. A comparator (21) detects a possibly existing time overrun and, with a time overrun signal (27), triggers a wiping operation in the opposite direction relative to the preceding wiping operation by reversing the electromotor (10). The windshield wiping arrangement according to the invention makes it possible to maintain a limited wiping operation when a blocking occurs (B1, B2, B3), as can be caused, for example, by a snow load on a windshield to be cleaned.

8 Claims, 3 Drawing Sheets

WINDSHIELD WIPER ARRANGEMENT

BACKGROUND OF THE INVENTION

The invention is based on a windshield wiping arrangement, and more particularly to a windshield wiping arrangement that includes at least one wiper arm which is operated between stop positions by an electromotor with reversible rotational direction, having a time determination device which determines a time following the triggering of a wiping operation, a time presetting device for presetting a maximum allowable time, and a comparator which compares the maximum preset time with the determined time and which triggers a wiping operation in the opposite direction if a maximum allowable time is exceeded of the generic type. From DE-OS 40 32 922, an arrangement for wiping a windshield is known, for which the positions of the wiper arms in dependence on the predetermined desired positions are respectively controlled with a regulator. An overload or a blocking of a wiper arm is detected if a predetermined limit for a regulated condition is exceeded. Once an overload condition is detected, varied measures can be provided with the goal of maintaining a limited wiping operation. Such an overload condition can occur, for example, as a result of a snow load. The known device includes a position measuring device for each wiper arm. A limited wiping operation can be determined through wiping experiments, wherein the positions for the wiping limits are known from the position measuring devices.

SUMMARY OF THE INVENTION

It is the object of the invention to provide a windshield wiping arrangement, which permits a limited wiping operation with simple means in the case of a location-dependent overload.

The object is achieved, in a windshield wiping arrangement of the generic type identified above, by providing that the time determination device determines the time until one of the stop positions is reached and that the maximum allowable time is fixed in dependence on the determined time.

The windshield wiping arrangement according to the invention is tailored to a wiping mechanisms powered by an electromotor, for which the rotational direction can be reversed. The windshield wiping arrangement according to the invention has the advantage that no expensive instruments are needed to measure the wiper position if a limited wiping operation is performed as a result of a locality-dependent overload. In accordance with the invention, a time-determination unit is provided, which determines the time following the triggering of a wiping operation. Furthermore, a time setting unit exists, which presets a maximum allowable time for half a wiping cycle from stop position to stop position. A comparator, which compares the maximum allowable time with the determined time, triggers a wiping operation in the direction opposite to the preceding wiping operation if a time overrun has been detected. These measures permit a limited wiping operation during an overload, caused for example by snow, wherein an electromotor driving the wiper is always reversed following completion of the preset maximum time interval. The stop positions no longer have to be reached. If the overload condition is eliminated, a return to the normal wiping operation from stop position to stop position is ensured without requiring further measures.

One particularly advantageous embodiment provides that following a reversal triggered by the comparator, the time determination unit determines the time until the wiper has again reached a stop position, insofar as it can reach the stop position. The determined time is advantageously used for fixing the new maximum allowable time for the following wiping operation. The reduction of the maximum allowable time shortens the waiting time until the reversal of the wiper at the blocking position.

One advantageous improvement provides for the presetting of additional time segments whenever an incomplete wiping cycle without reaching a stop position has occurred. This measure takes into account those cases where either a previously occurring blocking has completely disappeared or where both stop positions can no longer be reached because of an additional blocking. The presetting of additional time segments ensures a transition from the limited wiping operation to a complete wiping cycle if the blocking has disappeared. It is preferable if a counter is provided, which increments for each time overrun and which is reset each time a stop position is reached. The number of added time segments can then be preset in accordance with the counter reading. One embodiment provides for limiting the presetting of added time segments to a total maximum allowable time which, for example, corresponds to an original maximum allowable time that is calculated for the normal cleaning of a windshield. One advantageous embodiment provides that once the original maximum allowable time is reached without the overload condition being eliminated in the meantime, there is a return to the shortened maximum allowable time, which was fixed following the occurrence of the first blocking when reaching the stop position. This measure periodically reduces the waiting time until the wiper arm is reversed at the blocking positions.

One advantageous embodiment provides that the reduced wiping operation is limited to a preset residual wiping field quantity. If this residual wiping field quantity is not reached, which can be determined with the time determination unit, a complete shut-down of the wiping operation is planned for example.

One useful improvement provides that the driving power of the electromotor is reduced for a detected overload in order to protect the drive. Such a reduction, for example, provides for a reduction by one power stage, if several power stages can be preset.

DESCRIPTION OF THE PREFERRED EMBODIMENTS

Figure 1:
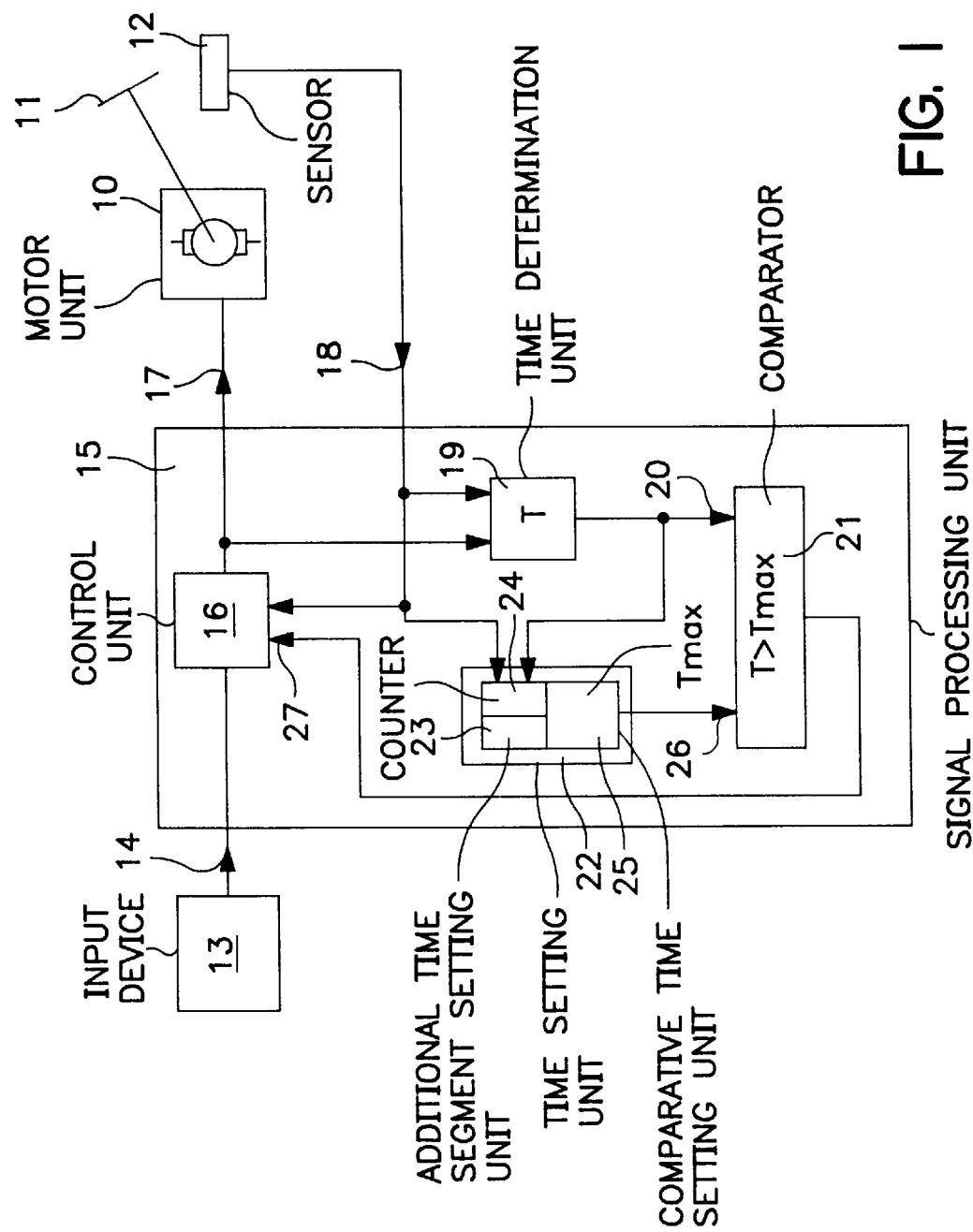
FIG. 1 shows a block wiring diagram for a windshield wiping arrangement according to the invention.

FIG. 1 shows an electromotor 10 that operates a wiper arm 11, the two stop positions of which on a windshield that is not shown in detail are detected by a stop position sensor 12. Varied operational modes for wiper arm 11 are selected by an input device 13, which transmits an operational mode signal 14 to a signal-processing unit 15.

The signal-processing unit 15 contains a control unit 16, which emits an activation signal 17 to the electromotor 10. The control unit 16 receives a stop position signal 18 that is supplied by the stop position sensor 12 and which is also supplied to a time determination unit 19 as well as a time setting unit 22. Another input signal for the time determination unit 19 is the activation signal 17, which is transmitted from the control unit 16 to the electromotor 10. The time determination unit 19 transmits a result signal 20 to a comparator 21 as well as to the time setting unit 22. The time setting unit 22 includes an additional time segment setting unit 23, a counter 24 as well as a comparative time setting unit 25, which transmits a comparative time signal 26 to the comparator 21. The comparator 21 provides a time overrun signal 27, which is supplied as an input signal to the control unit 16.

Figure 2:
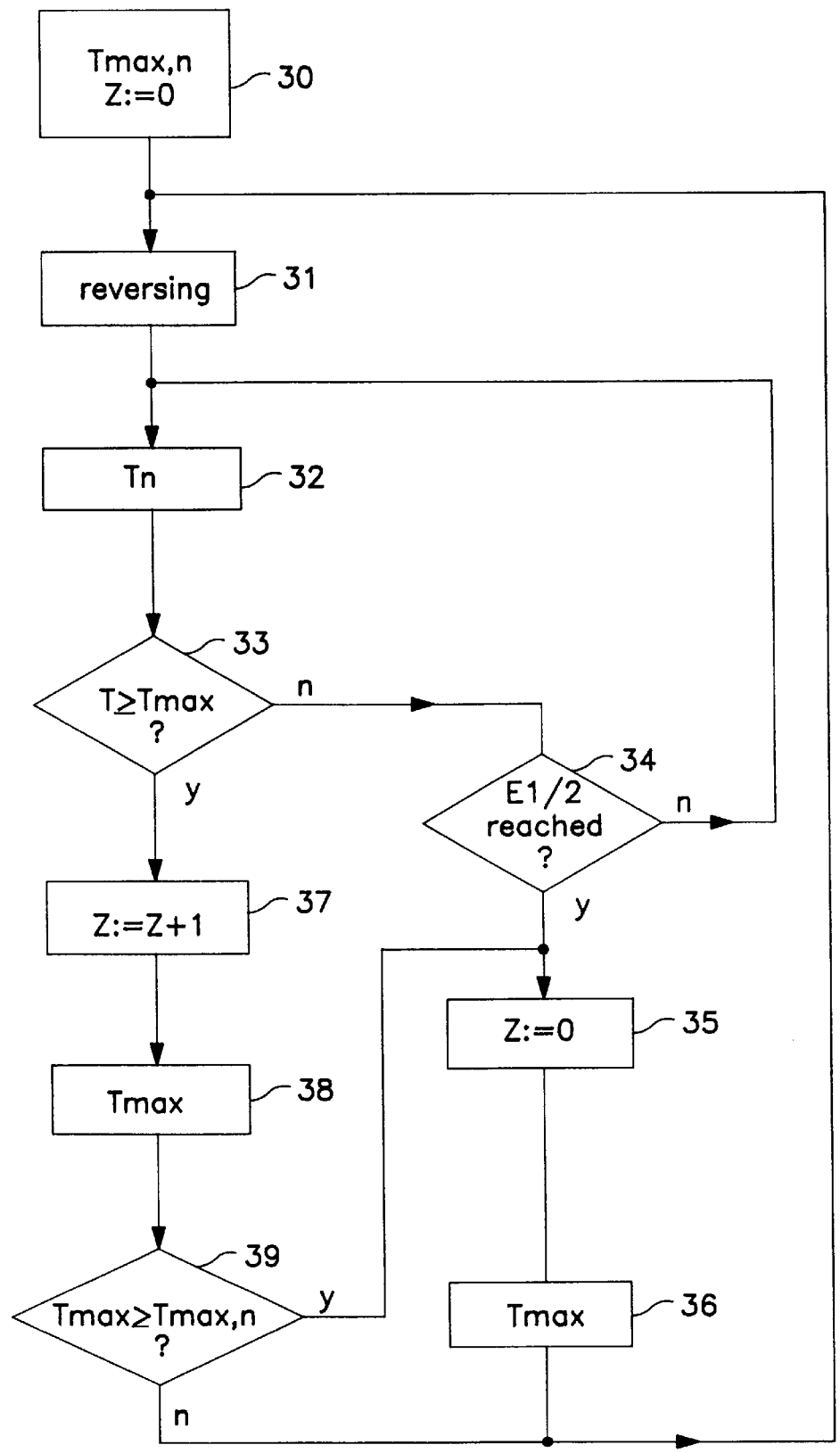
FIG. 2 shows a flow diagram of the sequence of operational steps occurring in the windshield wiping arrangement.
Figure 3:
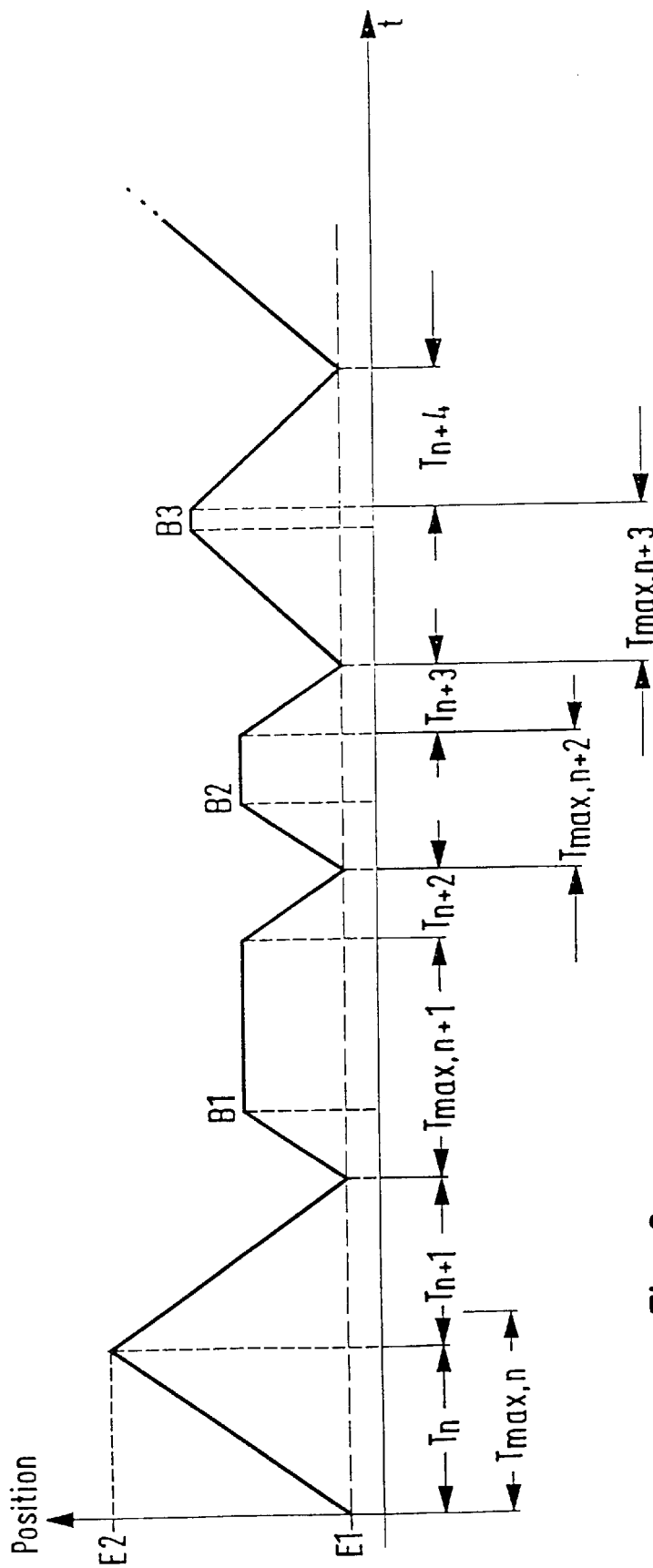
FIG. 3 shows an example of a position progression for a wiper arm in dependence on the time.

The operation of the arrangement illustrated in FIG. 1 is explained in more detail with the aid of the flow diagram shown in FIG. 2 and with the aid of the position progression for wiper 11 in dependence on the time t, as shown in FIG. 3.

The flow diagram shown in FIG. 2 starts with a first assignment 30, which provides for a setting of an originally maximum allowable time $T_{max,n}$ for half a wiping cycle. The maximum allowable time $T_{max,n}$ must be calculated to be sufficient for a normal wiping operation that extends from one stop position to the other stop position. The stop positions are given the references E1, E2 in FIG. 3. Furthermore, the counter 24 is set back to zero (Z:=0) during the first assignment 30.

A continuous wiping operation is, for example, started following the triggering of a corresponding operational mode signal 14 by the input device 13. In a second assignment 31, the control unit 16 transmits an activation signal 17 to the electromotor 10, which causes a reversal of the operation. Starting with the one stop positions E1, the wiper arm 11 performs half a wiping cycle until it reaches the other stop position E2. In a first functional unit 32, the time determination unit 19 determines the time needed for half the wiping cycle, which is entered in FIG. 3 with reference Tn. The time determination unit 19 is started with the activation signal 17, which is supplied to the electromotor 10.

In a first polling 33, it is determined in the comparator 21 whether the determined time $T_n$ is greater than (or equal to) the original maximum allowable time $T_{max,n}$. If this is not the case, it is determined in a second polling 34 whether the other stop position E2 was reached. If this is not the case, the determination of time $T_n$ is continued in the time determination unit 19, and it is again determined in the first polling 33 whether the time requirement is still met. If it is determined in the second polling 34 that the other stop position E2 of wiper arm 11 has been reached, a wiping operation in the opposite direction is again triggered in the second assignment 31 through the reversal of electromotor 10, that is following a third and fourth assignment 35, 36.

In the third assignment 35, the counter 24 for the time setting unit 22 is reset to zero, insofar as the counter reading deviates from zero. In the fourth assignment 36, a new maximum allowable time $T_{max}$ is determined, wherein it is not necessary to plan for a change with an undisturbed half of a wiping cycle. It is preferable if during the fourth assignment 36, an adjustment of the maximum allowable time $T_{max}$ is provided for, which takes into account the actually required time $T_n$ that was determined for half of a wiping cycle in the time determination device 19. The maximum allowable time $T_{max}$ is then fixed in such a way that the time $T_n$ is used as the basis for half a wiping cycle, to which an additional time segment is added, so that the other stop position E1, E2 can always be reached in the undisturbed wiping operation. The additional time segment is provided by the additional time segment determination unit 23. The number of additional time segments can be determined in dependence on the counter 24 reading. In the exemplary embodiment shown, an additional time segment is added when the timer reading is at zero.

Following the reversal of the electromotor 10, the following half of a wiping cycle is performed starting with the stop position E2, until the new stop position E1 is reached once more. During this half of a wiping cycle, the time determination unit 19 has determined the time $T_{n+1}$ in the first functional unit 32, wherein the comparator 21 has not detected a time overrun. Once the stop position E1 is reached, another half of a wiping cycle is triggered, starting with the stop position E1, through reversal of the electromotor 10. It is assumed that during this wiping cycle a blocking occurs at a first blocking position B1, for example caused by snow. During the first polling 33, the comparator 21 determines that the maximum allowable time $T_{max}$ has been exceeded. In FIG. 3, the maximum allowable time is given the reference $T_{max,n+1}$, as an indication that the maximum allowable time $T_{max,n+1}$ was fixed anew, if necessary on the basis of the last preceding half of a wiping cycle, which has lasted for the time interval $T_{n+1}$.

After it was determined during the first polling 33 by the time determination unit 19 that the maximum allowable time $T_{max,n+1}$ was exceeded at B1 because of the blocking, the counter 24 reading is increased by 1 in a fifth assignment 37. Subsequently, in a sixth assignment 38, the maximum allowable time $T_{max}$ is fixed for the following half of a wiping cycle. In the exemplary embodiment shown, this time preferably coincides with the previously applicable maximum allowable time $T_{max,n+1}$. Even though the counter reading in accordance with the fifth assignment 37 now shows the value 1 in the embodiment shown, it is not absolutely necessary to add two additional time segments that are provided by the additional time segment setting unit 23. It is initially sufficient here to add one additional time segment, as was also the case for the counter reading of zero, so that again exactly the maximum allowable time $T_{max,n+1}$ results.

In a subsequent third polling 39, it is determined whether the maximum allowable time $T_{max}$, fixed by the time setting unit 22 for the following half of a wiping cycle, is higher or the same as the original maximum allowable time $T_{max,n}$. It is not necessary to increase the maximum allowable time $T_{max}$ for half of a wiping cycle past this amount as this would only extend the waiting time for the wiper arm 11 in one blocking position.

If this is not the case, there is a move to the second assignment 31, which provides for a reversal of the electromotor 10 for starting the return operation in the direction of stop position E1. The stop position E1 is reached once more following a time interval $T_{n+2}$. The reaching of the stop position E1 is detected during the second polling 34. The counter 24 is reset during the third assignment 35 and the new, maximum allowable time $T_{max}$ for the following half of a wiping cycle is fixed in the fourth assignment 36. The new, maximum allowable time is determined in dependence on the time $T_{n+2}$ of the last incomplete half of a wiping cycle, which is determined in the time determination unit 19, whereby the stop position E1 was reached. The new, maximum allowable time is set to the value $T_{max,n+2}$. Subsequently, a reversal of the electromotor 10 is triggered again in the second assignment 31.

Following the reversal of the electromotor 10, starting with the stop position E1, a blocking condition is reached at a second blocking position B2, wherein an overrunning of the maximum allowable time $T_{max,n+2}$ is detected in the first polling 33. The previously reset counter 24 is increased in the fifth assignment 37 by One. In the subsequent, sixth assignment 38, the maximum allowable time $T_{max}$ can be fixed again. Since the timer reading is only One, it is not necessary to raise the maximum allowable time $T_{max}$ from the presently valid reading $T_{max,n+2}$ to higher readings. Once the third polling 39 is completed, the electromotor 10 is reversed once more during the second assignment 31, which reversal returns the wiper arm 11 from the blocking position B2 again to the stop position E1 during the time interval $T_{n+3}$.

Under the assumption that the blocking position B2 coincides with the blocking position B1 in the preceding step, the time $T_{n+3}$ needed to return the wiper 11 to the stop position E1 is at least approximately equal to the time $T_{n+2}$.

Following a renewed fixing of the maximum allowable time $T_{max,n+3}$, a new half of a wiping cycle is induced, which moves the wiper arm 11 until it reaches a blocking condition at a third blocking position B3. The third blocking position B3 is farther removed from the stop position E1 than the preceding blocking positions B1, B2. The return movement to stop position E1 lasts for the time interval $T_{n+4}$, which is longer than the time intervals $T_{n+2}$ and $T_{n+3}$. The maximum allowable time $T_{max,n+4}$ for the following half of a wiping cycle is therefore fixed correspondingly longer during the fourth assignment 36.

For the exemplary embodiment shown in FIG. 3, the stop position E1 can always be reached, despite a blocking occurring at B1, B2, B3 because the maximum allowable times, $T_{max,n+1}$; $T_{max,n+2}$, $T_{max,n+3}$ respectively have passed at the time the blocking occurs, so that the wiper arm 11 can always reach the stop position E1 without exceeding the time again. If the case occurs where no blocking is present at all during a newly started half of a wiping cycle, the case may occur where the wiper arm 11 is reversed as a result of the completion of the maximum allowable time $T_{max}$, before the wiper arm 11 has reached the other stop position E1, E2. This case occurs in particular if the windshield that is to be cleaned is already cleaned during the incomplete half of a wiping cycle in such a way that following the reversal of the electromotor 10, the friction is so high that the stop position E1, E2 can no longer be reached within the maximum allowable time $T_{max}$. In this situation, the counter 24 makes itself felt favorably in that the counter reading is respectively increased by One in the fifth assignment 37 for a time overrun detected previously in the first polling 33. Depending on the counter reading, the maximum allowable time $T_{max}$ can be increased to ensure in this case as well that the stop position E1, E2 is safely reached without a renewed time overrun, at least during one of the following wiping cycles.

Another operational situation can occur as well, for which the counter 24 ensures that in case a blocking ceases to exist, a normal wiping from stop position to stop position E1, E2 can be achieved again. The assumption in this case is that a blocking has occurred, for example at the positions B1, B2, B3, and that subsequently a stop position E1, E2 was reached once more, so that a shortened, new maximum allowable time $T_{max}$ was fixed for the following half of a wiping cycle. If the wiper arm 11 is then additionally blocked during its renewed return movement to the same stop position E1, E2 before reaching the stop position E1, E2, then the stage-by-stage increase of the maximum allowable time $T_{max}$ by raising the counter reading in the fifth assignment 37 ensures that in case of a cessation, in particular of the initially occurring blocking, one stop position E1, E2 or both stop positions E1, E2 immediately can be reached.

For the arrangement according to the invention, the case is also taken into account where a blocking occurs during which none of the stop positions E1, E2 can be reached immediately by the wiper arm 11, so that a shortened, maximum allowable time $T_{max,n+1}$; $T_{max,n+2}$; $T_{max,n+3}$ can no longer be preset in the fourth assignment 36. In order to avoid a long waiting time for the wiper arm 11 when reaching the blocking positions B1, B2, B3 until the reversal operation, the maximum allowable time can be reduced during the sixth assignment 38, wherein it is not possible to proceed from a previously determined time. For example, the time could be set to a value that corresponds to half of a wiping cycle. An increase in the counter reading and thus also an increase in the additional time segments ensures that at least one of the limit stops E1, E2 is reached after the blocking has disappeared.

For each overrun of the maximum allowable time $T_{max}$, which is determined during the first polling 33, an increase in the counter reading during the fifth assignment 37 would soon preset an unnecessarily high maximum allowable time $T_{max}$ during the sixth assignment 38. This is prevented by the third polling 39, which ensures that the maximum allowable time $T_{max}$ does not increase above the originally planned value for the maximum allowable time $T_{max,n}$. Should this have occurred, the counter 24 is subsequently reset during the third assignment 35, so that a shortening of the maximum allowable time is possible during the renewed setting of the maximum allowable time $T_{max}$ in the fourth assignment 36.

The third polling 39 also prevents an increase in the maximum allowable time $T_{max}$ to unnecessarily high values for the case where an additional blocking has occurred after a first blocking, wherein a stop position E1, E2 could still be reached after the first blocking and, as a result of that, a shortened maximum allowable time $T_{max}$ was fixed.

The third polling 39 in those cases leads to a periodic reduction of the waiting time for wiper arm 11 at blocking positions B1, B2, B3. When the blocking is gone, it is possible to again return successively to a complete half of a wiping cycle.

In accordance with one advantageous improvement of the arrangement according to the invention, a reduction of the electrical power to the electromotor 10 is provided for a detected overrunning of the maximum allowable time $T_{max}$. The reduction in power protects individual components of the drive as well as the electronic power components, in particular if wiper arm 11 is blocked. For wiping systems with several power stages that can be preset, a reduction by at least one stage can be planned.

Another advantageous improvement provides that if a blocking condition has been detected and for a possibly planned increase in the time during which the electromotor 10 receives current, sufficiently long break times are maintained through an increase in the counter reading, so that the electromotor 10 is not thermally stressed to excess.

We claim:

1. A windshield wiping arrangement, comprising:
   a wiper arm (11);
   an electromotor (10) with reversible rotational direction to move the wiper arm (11) between stop positions (E1, E2);
   a time determination unit (19) for determining a time ($T_n$; $T_{n+1}$; $T_{n+2}$; $T_{n+3}$; $T_{n+4}$) following the triggering of a wiping operation;

a time setting unit (22) for setting a maximum allowable time ($T_{max}$; $T_{max,n+1}$; $T_{max,n+2}$; $T_{max,n+3}$) for half a wiping cycle; and a comparator (21) that compares the maximum preset time ($T_{max}$; $T_{max,n+1}$; $T_{max,n+2}$; $T_{max,n+3}$) with the determined time ($T_n$; $T_{n+1}$; $T_{n+2}$; $T_{n+3}$; $T_{n+4}$) and that triggers a wiping operation in the opposite direction if the maximum allowable time ($T_{max}$; $T_{max,n+1}$; $T_{max,n+2}$; $T_{max,n+3}$) is exceeded, wherein the time determination unit (19) determines the time ($T_n$; $T_{n+1}$; $T_{n+2}$; $T_{n+3}$; $T_{n+4}$) until one of the stop positions (E1, E2) is reached, and wherein the time setting unit (22) sets the maximum allowable time ($T_{max}$; $T_{max,n+1}$; $T_{max,n+2}$; $T_{max,n+3}$) in dependence on the determined time ($T_n$; $T_{n+1}$; $T_{n+2}$; $T_{n+3}$; $T_{n+4}$).

2. A windshield wiping arrangement according to claim 1, wherein the time setting unit (22) comprises an additional time segment setting unit (23), and a comparative time setting unit (25) that adds at least one additional time segment which is set by the additional time segment setting unit (22) to the time ($T_n$; $T_{n+1}$; $T_{n+2}$; $T_{n+3}$; $T_{n+4}$) determined by the time determination unit (19).

3. A windshield wiping arrangement according to claim 1, wherein the time setting unit (22) comprises a counter (24) which is incremented following each incomplete half of a wiping cycle where the stop position (E1, E2) was not reached, and which is reset after reaching a stop position (E1, E2).

4. A windshield wiping arrangement according to claim 3, wherein the time setting unit (22) further comprises an additional time segment setting unit (23), and a comparative time setting unit (25) that adds at least one additional time segment which is set by the additional time setting unit (22) to the time ($T_n$; $T_{n+1}$; $T_{n+2}$; $T_{n+3}$; $T_{n+4}$) determined by the time determination unit (19), the number of additional time segments that are added depending on the number of detected time overruns.

5. A windshield wiping arrangement according to claim 1, wherein a residual field quantity is limited to a minimum preset value.

6. A windshield wiping arrangement according to claim 1, wherein a collector ring is provided as a stop position sensor (12), designed to determine the stop positions (E1, E2).

7. A windshield wiping arrangement according to claim 1, wherein an upper limit is provided for the maximum allowable time ($T_{max}$; $T_{max,n+1}$; $T_{max,n+2}$; $T_{max,n+3}$).

8. A windshield wiping arrangement according to claim 1, further comprising means for reducing the electrical power supplied to the electromotor (10) following an overrun of the time detected by the comparator (21).

* * * * *